June 6, 1933.  J. F. DENNEY  1,913,140
CALCULATING DEVICE
Filed Aug. 23, 1929  7 Sheets-Sheet 4
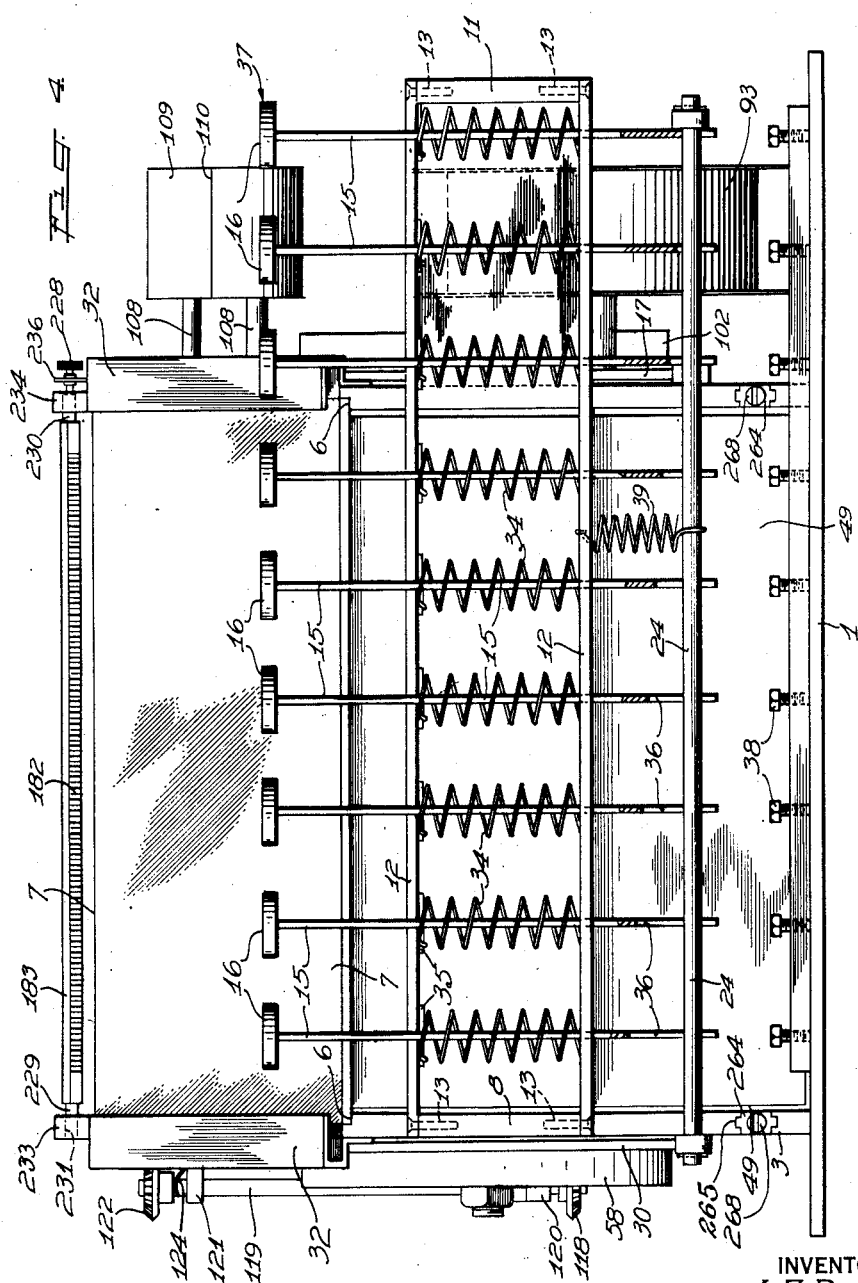
INVENTOR
J. F. DENNEY
BY Munn & Co.
ATTORNEY

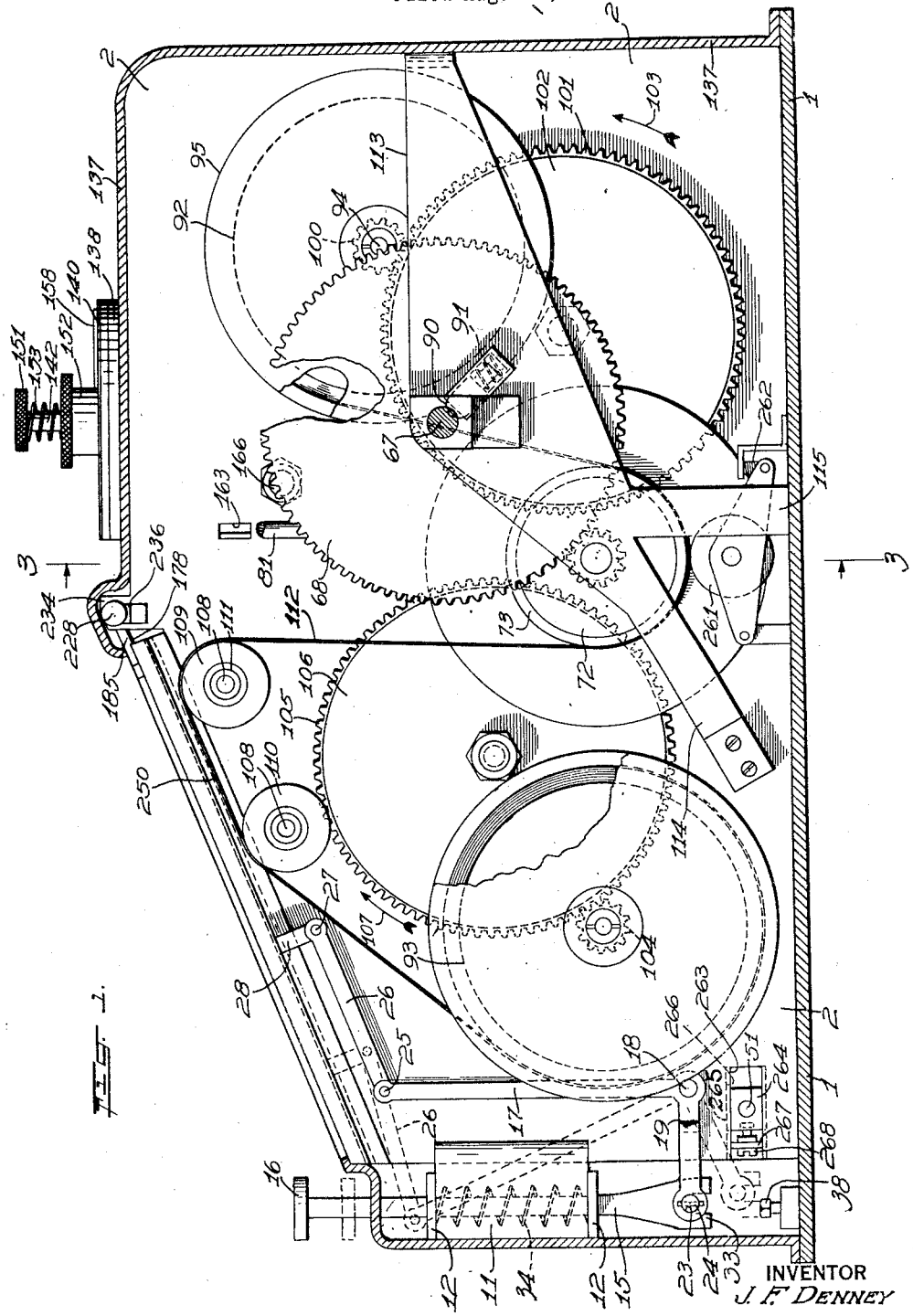

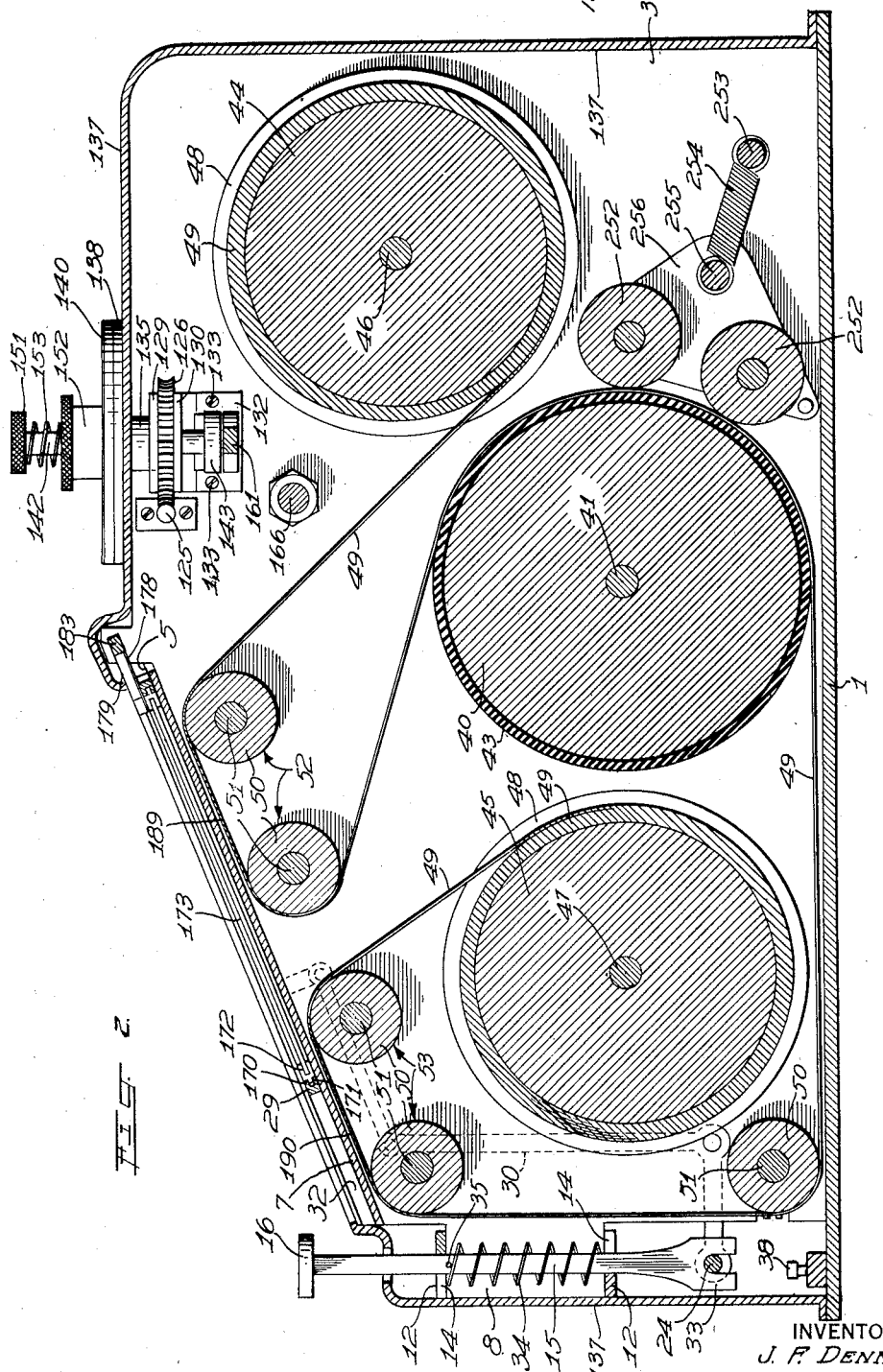

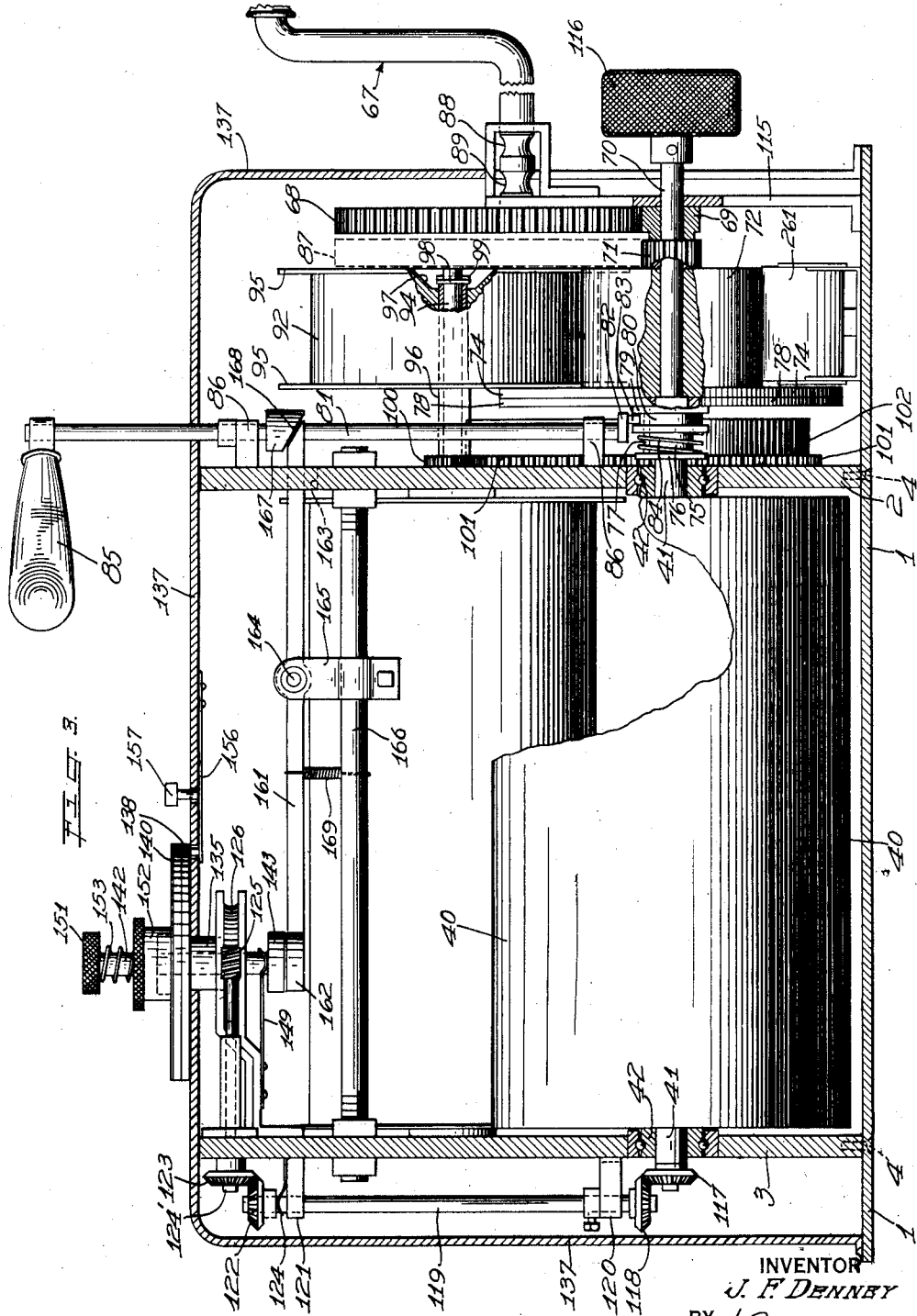

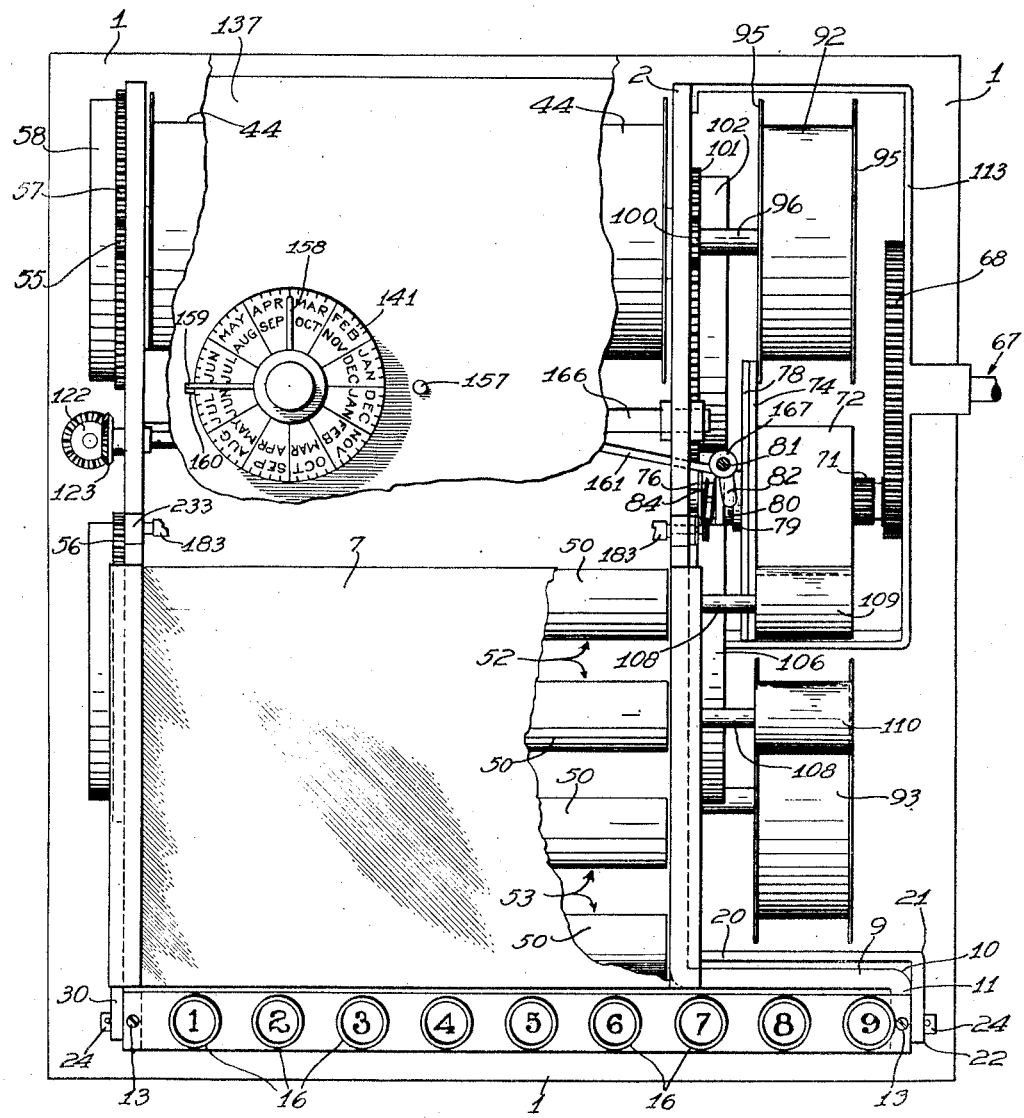

June 6, 1933.  J. F. DENNEY  1,913,140
CALCULATING DEVICE
Filed Aug. 23, 1929  7 Sheets-Sheet 6
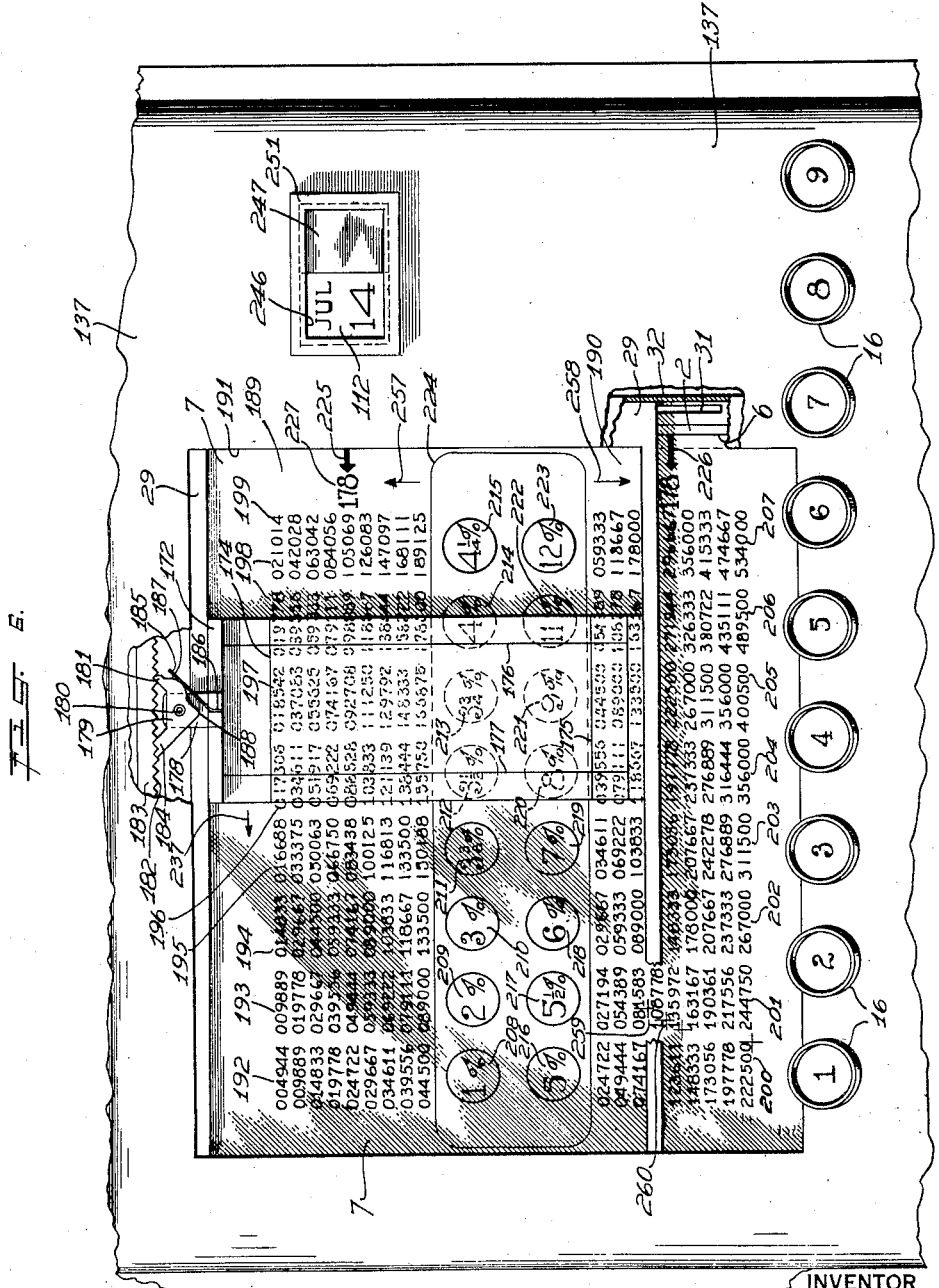
INVENTOR
J. F. DENNEY
BY Munn & Co.
ATTORNEYS June 6, 1933. J. F. DENNEY 1,913,140
CALCULATING DEVICE
Filed Aug. 23, 1929 7 Sheets-Sheet 7
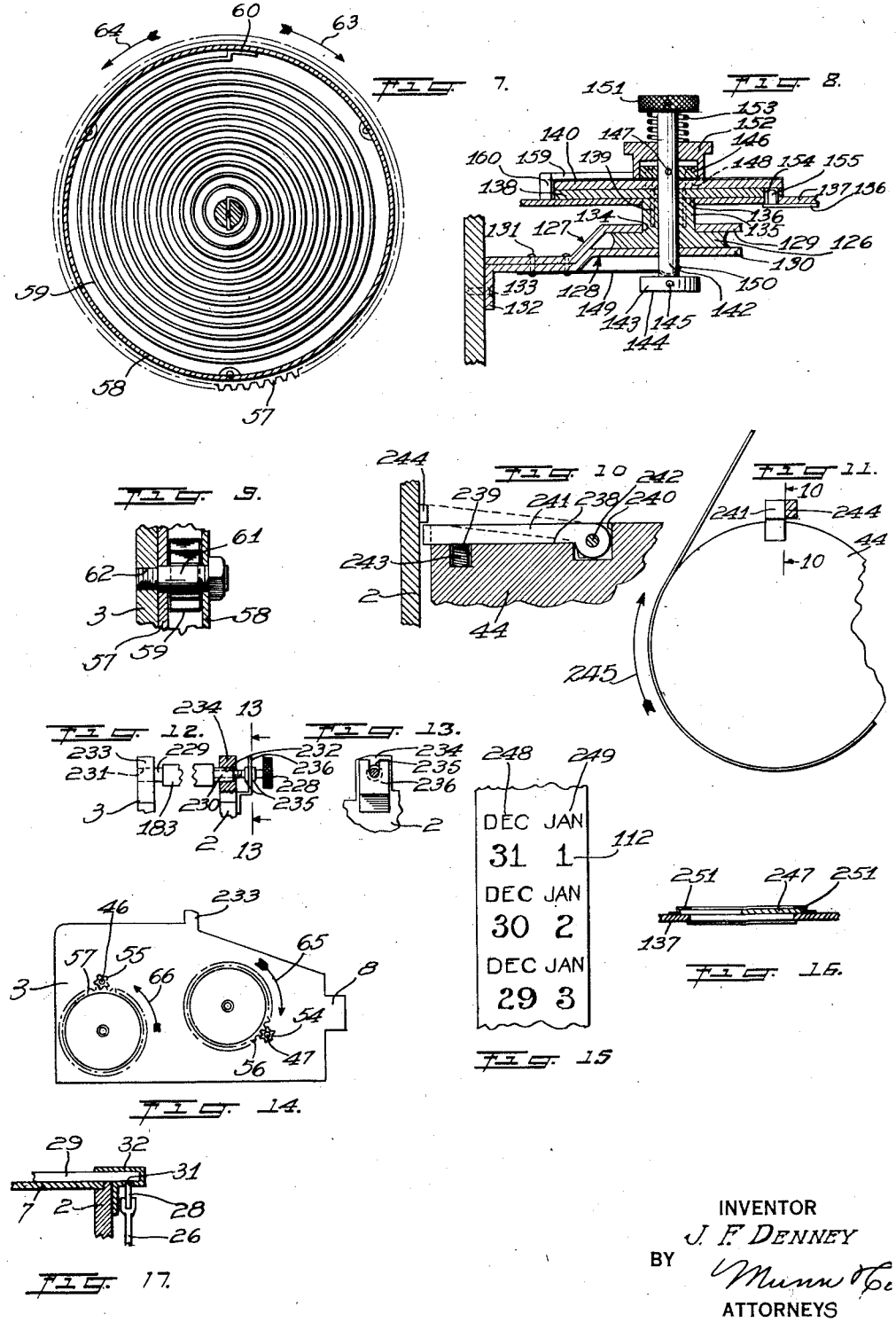
INVENTOR
J. F. DENNEY
BY
ATTORNEYS Patented June 6, 1933

1,913,140

UNITED STATES PATENT OFFICE

JACOB F. DENNEY, OF FORT RECOVERY, OHIO

CALCULATING DEVICE

Application filed August 23, 1929. Serial No. 387,985.

My invention relates to improvements in calculating devices, and it consists in the combinations, constructions, and arrangements herein described and claimed.

An object of my invention is to provide a calculating machine in which novel means is provided whereby time and accrued interest may be quickly and accurately determined in a single operation.

A further object is to provide a calculating device in which novel means is provided for selecting the interest result and in which means is provided whereby the mechanism for selecting the interest result may be accurately and quickly adjusted.

A further object is to provide a calculating device of the type employing a tape having interest tables upon its sides and a band having legends representing months and days, and in which means is provided whereby said tape and said band may be moved in synchronism or independently of each other.

A further object is to provide a calculating device employing a tape provided with interest tables upon two sides, and in which means is provided for presenting a portion of each side before a common window.

A further object is to provide a calculating device whereby interest may be computed by a common device for determining interest on a basis of a 360- or 365-day year.

A further object is to provide a calculating device in which novel means is provided for preventing the continued movement of certain parts of the machine when the desired date has been reached.

Other objects and advantages will appear in the following specification, and the novel features of the invention will be particularly pointed out in the appended claims.

My invention is illustrated in the accompanying drawings, forming part of this application, in which Figure 1 is a side elevation, partly in section, of my device, Figure 2 is a longitudinal sectional view taken substantially at the center of the device, Figure 3 is a transverse sectional view taken substantially along the line 3—3 of Figure 1, Figure 4 is a front elevation of my device with the casing removed and certain other parts removed for the sake of clearness, Figure 5 is a fragmentary top plan view of my device, Figure 6 is a top plan view of the rate window and time window showing the interest tables and the mechanism associated therewith for computing accrued interest, Figure 7 is a sectional view of one of the spring means employed for providing tension in certain elements in the device, Figure 8 is a sectional detail view of a stop mechanism, Figure 9 is a sectional detail view of the manner in which the structure shown in Figure 7 is mounted, Figure 10 is a sectional detail view of a stop mechanism associated with certain rollers and taken along the line 10—10 of Figure 11, Figure 11 is an end elevation of the structure shown in Figure 10, Figure 12 is a fragmentary sectional view of a rack adjusting mechanism, Figure 13 is a sectional view taken along the line 13—13 of Figure 12, Figure 14 is a diagrammatic side elevation of a portion of my device, Figure 15 is a detail view of a portion of the time strip employed, Figure 16 is a sectional view of the structure relating to the time window, and Figure 17 is a fragmentary sectional detail view of a portion of my device.

In carrying out my invention, I make use of a base 1 upon which spaced-apart side plates 2 and 3 are mounted. The plates may be secured to the base in any suitable manner, such as welding or by means of screws 4, as shown in Figure 3. The plates 2 and 3 are provided with inclined portions 5, see Figures 1, 2, and 4. The side plates are grooved as at 6, see Figure 4, for receiving a glass plate 7. The purpose of the plate 7 will be defined later.

The plate 3 is provided with a projecting portion 8, see Figure 2, and the plate 2 is provided with a projecting portion formed as at 9 and 10 in Figure 5. The portion 8 associated with the plate 3 is in alignment with the portion 11 associated with the plate 2. In referring to Figures 2 and 4, it will be noted that a strap of material 12 is disposed upon the upper and lower sides of the projecting portions 8 and 11. These pieces may be secured to the projecting portions by means of screws or bolts 13, see Figure 4.

The straps 12 are provided with slits 14. The slits in one of the straps are oppositely disposed with respect to the slits in the other strap. A key bar 15 is disposed within each of the slits 14. Each bar is provided with a key 16 numbered as shown in Figures 5 and 6.

Referring now to Figures 1 and 5, it will be noted that I have mounted a bell crank lever 17 upon the plate 2. The lever is pivotally mounted at 18. The lever is bent at 19 to provide a laterally extending portion 20 and is bent again at 21 to provide a portion 22 which is disposed substantially adjacent the portion 11 associated with the plate 2. The connecting portion 22 is provided with an opening 23, see Figure 1, for receiving a rod 24. The opposite end of the bell crank lever is pivotally connected at 25 with a link 26 operatively connected at 27 with a lug 28 associated with a movable frame 29. The movable frame is shown in Figures 2, 6, and 17. The plate 3 is also provided with a bell crank lever 30, see Figure 2. This lever is connected with the rod 24 and the movable frame 29.

Referring now to Figure 17, it will be noted that the lug 28 passes through a slot 31 in a guide member 32. In Figure 4, I have shown such a guide member associated with each of the side plates 2 and 3. The guide members 32 movably support the frame 29. The guide members may be secured to the side plates by welding. Each guide member is provided with a slot 31, whereby each side of the frame 29 is provided with a bell crank connection with respect to the rod 24. The key bars 15 are provided with U-shaped portions 33, whereby the key bars may be operatively connected with the rod 24. Referring now to Figure 4, it will be seen that I have provided a spring 34 upon each of the key bars and between the straps 12. One end of each of the springs 34 rests upon the bottom strap, and the upper ends of the springs are disposed in engagement with pins 35 carried by the key bars. Downward pressure upon one or all of the keys will cause a relative compression of the corresponding springs 34.

In Figure 4, I have shown the slotted portion 36 associated with each of the key bars as being progressively longer from right to left when looking at the machine from the front. The end key bar 37 is disposed in engagement with the rod 24. Movement downwardly of the key bar 37 will permit the bell crank levers 17 and 30 to be moved from the full line position to the dotted line position shown in Figure 1. Adjustable stop means 38 is provided for each of the key bars 15. A spring 39 is connected with the rod 24 and the lower strap 12. The spring 39 returns the rod 24 from the dotted line position shown in Figure 1 to its full line position.

Let us now refer to Figures 1, 2, and 3. In Figures 2 and 3, I have shown an actuating roller 40 mounted upon a shaft 41 which is supported by suitable roller bearings 42. The actuating roller is provided with a friction surface 43. The roller 40 is disposed between the side plates 2 and 3. Supply rollers 44 and 45, mounted upon shafts 46 and 47, respectively, are also disposed between the side plates 2 and 3. The shafts 46 and 47 may also be provided with roller bearings. The rollers 44 and 45 are provided with flanges 48. In Figure 2, I have shown portions of a band 49 as being wound upon the supply rollers 44 and 45. The ends of the band are secured to the supply rollers. A plurality of idle rollers 50, mounted upon shafts 51, is disposed between the side plates 2 and 3. The band 49 passes around the rollers as shown in Figure 2.

It will be seen that certain of the rollers are grouped to form units 52 and 53. These units are so aligned that portions of the band 49 are disposed substantially adjacent the glass 7 and in alignment therewith. The band passes around the units 52 and 53 in such a manner that one side of the tape is disposed adjacent the glass in connection with the unit 52 and the reverse side of the band in connection with the unit 53. Suitable roller bearings may be provided for the ends of the shafts 51 and secured to the side plates 2 and 3.

In Figure 14, I have shown a detail of the plate 3 and a part of the mechanism associated therewith. In this view, I have shown the shafts 46 and 47 associated with the supply rollers 44 and 45, respectively, as being provided with pinions 54 and 55. These pinions are in mesh with gears 56 and 57. The gears 56 and 57 and their functions are identical, and for this reason the description of one will of course suffice for both units. Referring now to Figures 7 and 9, it will be noted that the gear 57 is provided with a casing 58 within which is disposed a spirally wound spring 59. One end of the spring is fixed with respect to the casing, as indicated at 60, and the opposite end of the spring is firmly secured to a stub shaft 61. The shaft 61 is disposed within a threaded opening 62 in the side plate 3. The shaft 61 is fixed against rotation. In other words, when the gear 57 is turned in the direction of an arrow 63, the tension of the spring 59 will be increased. The tension of the spring tends to cause a counter rotation of the gear 57, as indicated by an arrow 64. Referring now to Figure 14, it will be noted that the gears 56 and 57 tend to move in opposite directions, as indicated by arrows 65 and 66, respectively. The spring 59 associated with the gear 56 is oppositely wound with respect to the spring 59 associated with the gear 57; that is to say, the tension of one spring works against the tension of the other spring. Since the gears 56 and 57 are operatively connected with the supply rollers 45 and 44, respectively, through the medium of the pinions 54 and 55, respectively, it will be seen that the band 49 will be taut at all times by reason of the spiral springs 59.

The actuating roller 40 is connected with a crank 67, see Figure 3, through the medium of a gear 68 which is in mesh with a pinion 69 mounted upon the reduced portion 70 associated with the shaft 41. The pinion 69 is fixed upon the shaft portion 70. A companion pinion 71 is mounted for rotation upon the shaft portion 70. The pinion 71 is secured to a second actuating roller 72. The latter is provided with a frictional surface which I have indicated at 73 in Figure 1. The roller 72 is provided with a flange 74. The flange is preferably formed integrally with the roller 72. The roller and the pinion 71 may be rotated upon the shaft portion 70, as will be more fully explained later.

In Figure 3, I have shown a collar 75 mounted upon the shaft 41 between the flange 74 and the plate 2. The collar 75 is provided with a flange 76. The collar is also provided with a key 77. A clutch disc 78 is slidably mounted upon the collar 75 which is rigidly fixed with respect to the shaft 41. The clutch disc 78 is provided with a hub portion 79 having a recess 80 therein. The clutch disc 78 may be moved into frictional contact with the flange portion 74 through the medium of a clutch rod 81. The clutch rod is provided with an arm 82 having a pin 83 disposed within the recess or groove 80. The clutch disc 78 is normally held in frictional contact with the flange 74 by reason of a spring 84. The clutch disc may be thrown out of engagement with the flange 74 by a slight movement of a handle 85 which is mounted upon the clutch rod 81. Suitable brackets 86 may be provided for mounting the clutch rod upon the side of the plate 2.

The gear 68 associated with the crank 67 may be moved from the full line position shown in Figure 3 to the dotted line position indicated at 87. At this time, the gear 68 will be disposed in mesh with the pinion 71. At this time, when the clutch disc 78 is moved out of engagement with the flange 74, the actuating roller 72 may be rotated upon the shaft portion 70 and independently of the actuating roller 40.

When, however, the clutch disc 78 is disposed in frictional contact with the flange 74 and the crank 67 is turned, the rollers 40 and 72 will be moved in unison. In Figures 3 and 1, I have shown the crank 67 as being provided with grooves 88 and 89. A spring-pressed pin 90 is held in engagement with that portion of the crank provided with the grooves 88 and 89 by means of a spring 91. The pin 90 is arranged to be disposed within one of the grooves associated with the crank 67, depending upon the position of the gear 68. When the gear 68 is in the full line position shown in Figure 3, the pin is disposed within the groove 89, and, when the gear 68 has been shifted from the full line showing to the dotted line showing, the pin will be disposed within the groove 88. The purpose of the spring-pressed pin is to yieldingly lock the gear 68 in one of its shifted positions. The end of the pin is shaped in such a manner that the pin will be automatically depressed when the crank is moved inwardly or outwardly with respect to the machine proper.

A pair of supply rollers 92 and 93 is disposed upon the side plate 2 as shown in Figure 5. The shafts 46 and 47 are provided with reduced extended portions 94, as shown in Figure 3. In view of the fact that both of the shafts are identically reduced and the specific structure associated with each reduced portion is identical in construction, the description at this time will be confined to a single unit. Referring now to Figure 3, I have shown the supply roller 92 as being provided with flanges 95. The roller is provided with a sleeve 96 which is fixed with respect to the roller. The roller may be provided with a recess 97 for receiving a washer 98 and a pin 99, whereby the roller will be locked against longitudinal movement upon the shaft portion 94. The recess permits the gear 68 to be moved substantially adjacent the end of the supply roller. A pinion 100 is fixed upon the sleeve 96 and is disposed in engagement with a gear 101.

The gear 101 is provided with a casing 102. The casing is identical in construction with the casing 58 shown in Figures 7 and 9 and therefore requires no detailed description. The casing is also provided with a spring similar to the spring 59, which tends to move the gear 101 in the direction indicated by an arrow 103 shown in Figure 1. The supply roller 93 is provided with a pinion 104 which is in mesh with a gear 105. The gear 105 is provided with a casing 106 containing a spiral spring identical in construction with that disclosed in Figures 7 and 9 which tends to move the gear in the direction of an arrow 107.

The shafts 51 associated with the unit 52 shown in Figure 2 are provided with reduced extended portions 108, see Figures 4 and 1. A pair of rollers 109 and 110 is mounted upon the reduced portions 108. The rollers may be provided with roller bearings indicated generally at 111 in Figure 1. A time tape 112 passes around the rollers 109 and 110 and has a portion of its opposite ends wound upon the supply rollers 92 and 93 and its ends secured thereto. The rollers 109 and 110 are disposed in alignment with the rollers associated with the unit 52 shown in Figure 2. The spiral springs within the casings 102 and 106 are oppositely wound, whereby the time tape 112 is taut at all times. It will now be seen that when the clutch disc 78, see Figure 3, is disposed in engagement with the flange 74, the time tape 112 will be moved simultaneously with the band 49 shown in Figure 2 when the crank 67 is turned. The time tape 112 may be moved through the medium of the crank 67 independently of the band 49 by shifting the gear 68 to the dotted line position shown in Figure 3 and moving the crank when the clutch disc 78 is moved away from the flange 74. The band 49 may also be moved independently of the time tape 112 by releasing the clutch and turning the handle 67 when the gear 68 is in mesh with the pinion 69.

In Figures 1 and 3, I have shown a bracket 113 for supporting the crank 67. The bracket is provided with an end portion 114 which is secured to the face of the side plate 2 and a base portion 115 which may be secured to the base 1 as by welding. In Figure 3, I have shown a knurled knob 116 which is fixed upon the shaft portion 70. The shaft 70 may be turned through the medium of the knob 116 independently of the crank 67, as will be more fully explained later.

Let us now refer to Figure 3. The end of the shaft 41 associated with the side plate 3 is provided with a bevel gear 117 disposed in mesh with a companion bevel gear 118 mounted upon a shaft 119. Brackets 120 and 121 may be secured to the side plate 3 for supporting the shaft 119. The latter is provided with a bevel gear 122 which has splined relation with the shaft 119 and is disposed in mesh with a bevel gear 123. A spring 124 may be mounted upon the bracket 121 for holding the gear 122 in mesh with its companion gear 123. The gear 122 may be moved against the spring 124, whereby the gear may be moved out of engagement with the gear 123. The gear 123 is mounted upon a shaft 124' upon which a worm 125 is mounted. The worm is disposed in mesh with a worm gear 126, see also Figure 2.

In Figure 8, I have shown a detail of the bracket for supporting the worm gear 126. The bracket comprises two pieces of strap material 127 and 128 provided with spaced-apart portions 129 and 130, respectively, between which the worm gear is disposed. The opposite ends of the members 127 and 128 are placed together and may be made secure by any suitable means, such as welding or riveting as shown at 131. One of the members is bent to form a base portion 132 which is rigidly secured to the side plate 3 by means of a screw or bolt 133. The piece 127 is provided with an opening 134 through which a hub 135 associated with the worm gear 126 projects. The hub portion also extends through an opening 136 in a casing 137 which I provide for enclosing the machine.

The manner in which the casing 137 encloses the device is shown in Figures 1, 2, and 3. The upper end of the hub is disposed substantially flush with the outer face of the casing adjacent the hub. The bracket above referred to supports the worm gear in a fixed relation with respect to the casing. A base plate 138 is disposed upon the end of the hub and upon the outer face of the casing. The base plate may be locked against rotation with respect to the hub by means of suitable pins 139. The base plate normally supports a dial plate 140. The latter, see Figure 5, is provided with a plurality of divisions 141 representing the months of a year. The names of the months are arranged in two circles and read in opposite directions, and the month beginning the year of one circle being the last month in the year associated with the other circle.

Going back to Figure 8, it will be noted that the spaced-apart portion 130 associated with the bracket, the gear and its hub, the base plate 138, and the dial plate 140 are provided with central openings which are disposed in alignment for receiving a shaft 142. The engaging faces of the base plate 138 and the dial plate 140 are preferably knurled, whereby the plates are frictionally held together when the dial plate is disposed upon the base plate. One end of the shaft 142 is provided with a flange portion 143 having a knurled face 144. The flange is fixed upon the shaft 142 by means of a pin 145. A collar 146 is mounted upon the shaft 142 and disposed adjacent the dial plate 140. The collar is preferably pinned to the shaft as indicated at 147. The collar 146 is also fixed to the dial plate by means of screws 148. The dial plate 140 is yieldingly held in engagement with the base plate 138 by reason of a spring 149. The latter is forked as at 150 and bears against the flange 143 upon opposite sides of the shaft 142. The spring may be mounted upon the bracket through the medium of the rivets 131.

The outer end of the shaft is provided with a head 151. A movable cap 152 is disposed upon the shaft between the head 151 and the dial plate 140. The cap is normally held in engagement with the outer face of the dial plate by means of a compression spring 153. The base plate 138 is provided with an opening 154 for receiving a lug 155 associated with a spring 156 when the plate is positioned for bringing the opening in alignment with the lug 155. The spring 156 is preferably secured upon the inner top portion of the casing as shown in Figure 3. The spring may be depressed for moving the lug out of engagement with the opening 154 by pressing a button 157. The cap 152 is provided with a pointer 158 and a stop arm 159 disposed at right angles to the pointer. The stop arm projects beyond the edge of the dial disc and is arranged to engage a stop lug 160 when moved to the position shown in Figures 5 and 8.

The dial disc 140 may be moved out of engagement with the base plate 138 by grasping the head 151 and lifting the shaft against the tension of the spring 149. Any longitudinal movement of the shaft will cause a relative movement of the collar 146 and the dial disc 140. The spring 149 normally holds the dial disc in operative relation with respect to the base plate. The cap 152 may be lifted free from the dial disc 140 against the tension of the spring 153, whereby the pointer may be moved to various positions, as will be more clearly explained later. The dial disc may also be lifted away from the base plate 138 through the medium of a lever 161, see Figure 3. The lever is provided with a head 162 arranged to engage the flange 143. The opposite end of the lever projects through an opening 163 in the side plate 2, see Figures 3 and 1. The lever fulcrums at 164 by reason of a clip 165 which may be mounted upon a spacing bolt 166. The bolt is arranged to rigidly hold the plates 2 and 3 in spaced relation. The outer end of the lever is provided with a cam surface 168 which is disposed adjacent a cam 167 carried by the clutch rod 81.

It will thus be seen that the lever 161 will be moved for lifting the dial disc 140 when the handle 85 is moved. A spring 169 may be provided for holding the head portion 162 away from the flange 143.

The movable frame 29 shown in Figure 6 is provided with a groove 170, see Figure 2, in its upper and lower sides. The grooves are arranged to receive tongue portions 171 associated with frame portions 172, see Figure 2. A piece of transparent material, such as glass or celluloid, indicated at 173, is fixed to the members 172. The members 172 and the transparent portion 173 may be called a shuttle for convenience. The shuttle is provided with horizontal hair lines 174 and 175, see Figure 6, and perpendicular hair lines 176 and 177. The shuttle is arranged for movement with respect to the frame 29. The movement of the shuttle is at right angles to the movement of the frame 29. The upper frame portion 172 is provided with a plate 178 upon which a dog 179 is mounted by means of a pin or rivet 180. The dog is provided with an engaging point 181 which is normally disposed between a pair of teeth 182 of a rack bar 183. The dog is also provided with an extension 184 arranged to engage one of the teeth upon the rack for cooperating with the point 181 in spacing the movement of the shuttle when the machine is being operated. The dog is normally held in the position shown in Figure 6 by reason of a spring 185 which is secured at 186 upon the frame member 172. The dog is provided with a cam portion 187 against which a spring bears. When the frame 29 is moved in a direction away from the rack 183, the dog will of course be moved out of engagement with certain of the teeth 182. At this time, the spring will pivot the dog about its axis 180 a sufficient distance to bring the point 181 into the space adjacent the space previously occupied by the point. In other words, each time the frame 29 is moved, the dog will be moved out of engagement with the rack, and, when the frame 29 is moved back to its normal position, the dog will have caused the shuttle to have shifted a space equal to the distance between two of the teeth.

When the frame 29 is moved away from the rack, the dog will pivot about its axis until the point 188 engages the spring 185.

The rollers 50 comprising the unit 52 shown in Figure 2 are arranged to present a portion of the band 49 adjacent the glass 7 as indicated at 189. The rollers 50 comprising the unit 53 present a portion 190 of the opposite side of the band to the glass. These portions are substantially adjacent the under surface of the glass. The casing 137, see Figure 6, is provided with an opening 191 substantially conforming to the size and shape of the glass 7. This opening in connection with the glass may be termed the "rate window." Two of the edges of the opening 191 terminate substantially in alignment with the inner faces of the side plates 2 and 3.

In referring to Figure 6, it will be noted that one side of the band 49 is provided with a plurality of columns of figures as indicated at 192 to 199, inclusive. The opposite side of the band is also provided with the same number of columns of figures as indicated at 200 to 207, inclusive. It will also be noted that the figures are arranged in horizontal alignment as well as perpendicular alignment. The perpendicular columns are associated with legends indicating rates of interest. In other words, the columns of figures indicated at 192 to 199, inclusive, are associated with various rates of interest as indicated at 208 to 215, inclusive. The columns of figures shown at 200 to 207, inclusive, are associated with rates of interest indicated at 216 to 223, inclusive. The rates of interest indicated at 208 to 223, inclusive, are preferably printed upon the glass 7. The glass associated with these rates is also provided with an opaque portion indicated at 224.

In Figure 6, I have shown the glass 7 as being provided with a pair of arrows 225 and 226. The interest tables comprising the columns of figures illustrated at 192 to 207, inclusive, upon both sides of the band 49 preferably cover a period from one day to ten years. One side of the band 49 is provided with figures representing days and years as indicated at 227. The band 49 is positioned in Figure 6 to indicate an elapse of time amounting to 178 days. The portions of the band 189 and 190 shown in Figures 2 and 6 are arranged to present interest tables for one day and on amounts from one to nine dollars at the rates of interest indicated at 208 to 223, inclusive. In other words, the figures associated with the portion 189 relate to rates of interest ranging from 1% to 4¼% for a period of 178 days and from one to nine dollars, and the figures associated with the portion 190 relate to rates of interest ranging from 5% to 12% for a period of 178 days and from one to nine dollars. The columns of figures indicated at 192 to 207, inclusive, are of course arranged in continuous and unbroken columns. The roller units 52 and 53 are so arranged that interest tables for a period of a day or for a period of a year, depending upon the position of the band 49, are presented to the rate window.

The rack 183 shown in Figure 6 may be adjusted with respect to its longitudinal axis by means of a screw 228 shown in Figure 12. The ends of the rack are reduced to circular form in cross section, as at 229 and 230. These ends are supported within openings 231 and 232 in extended portions 233 and 234 associated with the side plates 3 and 2, respectively. One of the reduced end portions of the rack may be keyed to prevent rotation of the rack. The screw 228 is threaded into a threaded opening in the end portion 230 and is provided with flange portions 235 disposed upon opposite sides of a U-shaped member 236 which supports the screw against movement with respect to its longitudinal axis but permits rotation of the screw. The U-shaped member may be mounted upon the side of the side plate 2.

Thus it will be seen that the rack may be adjusted in either direction for permitting the hair lines 176 and 177 to register accurately. In referring to Figure 6, it will be noted that these hair lines are disposed between the perpendicular rows of figures upon the band 49. The pitch of the teeth 182 associated with the rack is such that when the dog 179 moves the shuttle one tooth to the left, as indicated by an arrow 237, the shuttle will be moved a distance equal to the space between two perpendicular rows of figures. In other words, the pitch of the teeth is of necessity based on the spacing of the perpendicular rows of figures.

Let us now consider Figures 10 and 11. In Figure 10, I have shown the supply roller 44 being provided with a groove 238 and communicating recesses 239 and 240. An arm 241 is pivotally mounted at 242 within the recess 240. A spring 243 is disposed within the recess 239 and is arranged to move the arm from the full line position to the dotted line position when the band 49 has been unwound from that portion of the roller 44 immediate the arm. When the arm has been moved to the dotted line position shown in Figure 10 and the full line position shown in Figure 11, the end of the arm will engage a lug 244 which is carried by the side plate 2. Such engagement will cause the supply roller 44 to be stopped. In Figure 11, I have indicated one end of the band 49 being secured to the roller. The stop mechanism comprising the arm and the lug prevents the band 49 from being torn off the roller. The unwinding movement of the band is indicated at 245.

The casing 137, see Figures 6 and 16, is provided with a time window 246 aligned with respect to the time tape 112 shown in Figure 1. The window is provided with a shutter 247 which is adapted to cover substantially one half of the time tape exposed to the window. The window is substantially equal in width to the width of the time tape.

In referring to Figure 15, it will be noted that the time tape 112 is provided with two columns of legends representing the months and days of the months as indicated at 248 and 249. The column 248 is reversed with respect to the column 249. The rollers 109 and 110 shown in Figure 1 are arranged to position a portion 250 of the tape 112 adjacent the time window 246. The shutter 247 shown in Figure 6 may be shifted from one side of the window to the other for exposing a date upon either side of the tape. In Figure 16, I have shown the shutter 247 as being slidably supported by means of a flange 251 which is carried by the casing 137.

That portion of the band 49 shown in Figure 2 which passes around the actuating roller 40 is disposed between the roller and a pair of pressure rollers 252. A spacing bolt 253 may be provided for holding the side plates 2 and 3 in spaced relation and at the same time providing means whereby a compression spring 254 may be anchored. The spring is operatively connected with a cross bar 255 which is connected at its ends with plates 256 which support the pressure rollers 252. The spring 254 yieldingly yet firmly holds the pressure rollers against the band 49. Since the surface of the roller 40 is provided with the anti-slipping cover 43, it will be seen that the band will be prevented from slipping with respect to the actuating roller.

In Figures 1 and 3, I have shown a pressure roller 261 as being disposed in engagement with the time tape 112. A spring 262 yieldingly yet firmly holds the roller in engagement with the tape for preventing slipping of the latter.

From the foregoing description of the various parts of the device, the operation thereof may be readily understood. The interest tables upon both sides of the band 49 are arranged in a sense in two sections. One of the sections upon each side relates to interest tables for each day for a period of a year. The other section upon each side relates to tables for each year from one year to ten years. The sections upon each side are reversed in their arrangement in that they read progressively in opposite directions from a common starting point. Attention is now called to Figure 6. The band 49 is arranged to move in the direction of an arrow 257 when the crank 67 is turned in a clockwise direction when facing the crank side of the machine. When the crank 67 is turned in the opposite direction, the band will be moved in the direction indicated by an arrow 258.

For the purpose of convenience I have selected the point upon the band 49 between the two sections of the interest tables upon each side of the band as a zero position at which the band 49 and the time tape 112 may be synchronized. When the zeros are opposite the arrows 225 and 226, the time tape 112 will read June 24. The left-hand portion of the tape will be exposed to the window 246, the other half being covered by reason of the shutter 247. When the crank 67 is turned in a clockwise position when the band 49 is in its zero position, interest tables for a period of one day will be arranged before the window 191. The portion of the tape 189 shown in Figure 6 provides interest tables for a period of one day at rates of interest varying from 1% to 4¼%. The interest tables associated with the portion 190 are for rates from 5% to 12% on amounts ranging from one to nine dollars. A continued movement of the crank in the same direction will present interest tables for a period of two days, and so on daily for a period of one year. When the band 49 is in its zero position and the crank 67 is turned in a counterclockwise direction, interest tables for a period of one year will be presented to the window. A continued movement of the crank will present interest tables for a period of two years, and so on successively for a period of ten years. For the purpose of illustrating the operation of my device, let us assume that the portions 189 and 190 of the band 49 are in their zero positions, at which time June 24 will appear in the time window 246. When working problems in simple interest, the shutter 247 is arranged to cover the right-hand column of legends upon the tape 112, as shown in Figure 6, and, when the device is employed for working problems in partial payments, the shutter is shifted from right to left for exposing the right-hand column of legends to the window. Let us further assume that our problem is to find the interest on a note whose principal is $345.90, dated January 17 down to to-day, which we will assume is July 14. Let us consider that the zero positions are aligned with the arrows 225 and 226. The time tape 112 may of course be moved independently of the band 49 by releasing the clutch mechanism shown in Figure 3. The crank 67 should of course be shifted for moving the gear 68 into engagement with the pinion 71 when it is desired to move the time tape 112 independently of the band. Then again the band 49 may be moved independently of the tape 112 by moving the gear 68 into engagement with the pinion 69 and releasing the clutch mechanism.

The first step in our process of computing the amount of accrued interest is moving the time tape 112 to a point where July 14 will be exposed before the window 246, see Figure 6. The tape should be moved independently of the band 49, the latter of course indicating zero. The crank is now turned in a clockwise direction until January 17, appears in the time window. The band 49 has now been moved in synchronism with the time tape 112. The note in the present instance bears interest at the rate of 5½%.

When January 17 shows in the window 246, the band 49 will have moved to a point where the figure 178 will appear in alignment with the arrows 225 and 226 as shown in Figure 6, which indicates that there has been an elapse of time of 178 days. In referring to Figure 5, it will be noted that the keys 16 are provided with indicating numerals arranged progressively from 1 to 9, inclusive. When the key 16 which bears the numeral 3 representing the first digit in the principal is pressed downwardly its full distance, that is, until the U-shaped portion of the key strikes the stop member 38 associated therewith, the shuttle provided with the hair lines is manually moved until one of its perpendicular hair lines divides the circle enclosing the 5½% rate. Either side of the shuttle may be employed. I provide hair lines upon each side of the shuttle for the purpose of permitting the latter to be of sufficient width and at the same time to permit either hair line to be employed, as when the shuttle is moved up close to the side of the window 191. For this particular problem we will select the perpendicular hair line 177 and the horizontal hair line 175. The intersecting point of these two lines may be considered as the indicating point. When the perpendicular line 177 passes through the center of the circle surrounding the 5½% interest rate and the key 3 is in its depressed position, the intersection of the two hair lines will be positioned at a point indicated at 259. The result indicates $8.1583. The hair lines represent the decimal position. The key 4 is now pressed, at which time the intersection of the two hair lines is positioned at a point indicated at 260, which shows a result of $1.08778. In the next step, key 5 is pressed and we have a result of $.135972. Key 9 is depressed, which gives us a result of $.024475. In adding these results, we have $9.406527, or, in other words, $9.41 as the amount of accrued interest.

For the purpose of illustrating the manner in which the machine is operated when working a problem involving partial payments, let us assume a note whose principal is $1265.00, bearing date July 10 and interest at the rate of 7%. In solving the second problem above mentioned, we of course will shift the shutter from the right to the left. The band 49 bearing the interest tables will occupy zero position and the time tape will be shifted for bringing July 10 before the window 246. The crank is now turned in a clockwise direction until August 3, which is the date of the first payment, shows in the window 246 and 24 days will appear in the rate window. This is the amount of time which has elapsed from the time of making the note to the time of the first payment. Striking the key 1 and transferring the shuttle to the thousandth notation under the 7% column, you find the interest on that amount to be $4.667. Pressing the key 2, the interest shown is $.933. (When key 1 is released, the shuttle automatically shifts to the hundredth notation). Striking key 6, $.28; key 5, $.023, which would total an accrued interest of $5.90. This is added to the principal $1265.00, making a total of $1270.90, from which a payment of $500.00 is deducted, leaving $770.90 for the new principal. Now the clutch lever is thrown and the crank turned counterclockwise until the rate window again is in zero position. The clutch is released and the crank is turned clockwise again until August 20, the date of the next payment, shows in the time window and 17 days is shown as the elapsed time in the rate window. Pressing the keys representing the new principal $770.90 under the 7% column as before, we get items of accrued interest $2.314, $.231, and $.003, which added to the principal $770.90 makes the final amount due $773.45.

Each time one of the keys 16 is depressed, the dog 179 is moved out of engagement with the rack 183. When the key is released, the spring 39 automatically moves the frame 29 back to its normal position, at which time the dog will engage an adjacent tooth, whereby the shuttle is moved laterally a distance equal to the unit of spacing between the perpendicular columns of figures. The shuttle may of course be shifted manually in either direction by moving the frame 29 sufficiently far to bring the dog out of engagement with the rack. In Figure 4, I have shown the key bars 15 as being provided with slots 36. The slotted construction is arranged so that when the key 16 marked 1 is depressed its full distance, the horizontal hair lines will move from their normal positions shown in Figure 6 to a position underneath the first horizontal lines of figures. When the key marked 2 is depressed its full distance, the horizontal lines will be moved from their normal positions to a position underneath the second horizontal lines of figures. Depressing the key marked 9 will move the horizontal lines to positions underneath the last horizontal rows of figures.

The lug 155, see Figure 8, is disposed within the opening in the plate 138 when the band 49 is in its zero position. The lug, when disposed within the opening in the plate, locks the device against movement. Pressure upon the button 157 will release the lug 155 from engagement with the plate 138, whereby the mechanism may be rotated. The dial mechanism shown in Figure 5 moves in synchronism with the interest tables and the time tape. In Figure 5 I have shown the stop arm 159 as being in engagement with the stop 160. Let us assume that we wish to move the time tape to indicate a certain day in the month of December. At this time, we lift upwardly on the cap 152, at which time the pointer 158 and the stop arm 159 may be easily rotated. The cap is rotated until the pointer 158 is moved to indicate December on the outer circle.

In Figure 5, I have shown each section 141 as being provided with a certain number of minor divisions. These divisions permit the pointer 158 to be positioned in an approximate position with respect to the date of the month which we are seeking. The pointer is set and the machine is then actuated through the medium of the crank. The crank is turned until the stop arm 159 engages the stop 160, at which time the resistance will stop the machine. In the event that the time tape is not accurately aligned, such alignment may be attained through the medium of the knurled knob 116. The gear ratio associated with the dial mechanism is such that very little resistance will suffice for stopping the machine. The arrangement of the months upon the inner circle is reversed and is used in connection with the right-hand column of legends associated with the time tape 112.

The gear 122 shown in Figure 3 may be moved out of engagement with its companion gear 124' for the purpose of synchronizing the transmission mechanism. A suitable opening may be provided in that portion of the casing 137 nearer the gear for permitting any suitable tool to be inserted. The face of the head 162 associated with the lever 161 is knurled, whereby a maximum amount of friction is attained between the flange 143 and the head. The supply rollers 44, 45, 92, and 93 are provided with stop mechanisms, such as that shown in Figures 10 and 11. In view of the fact that the stop mechanisms are identical in construction, the showing of one unit will of course suffice for all of the supply rollers. Any suitable lug means may be provided for engaging the arm 241 associated with the supply rollers 92 and 93.

Certain portions of the tape 112 associated with the 31st day of every month having 31 days are colored with some bright color, as, for instance, a bright red. The purpose of this is that when the tape is being operated at a high rate of speed, the figures are more or less blurred, and where interest is desired to be reckoned on the basis of a 365-day year, the operator notes the number of red flashes passing through the window, and, when he has reached his desired date, he then, to reduce the operation to the 365-day year basis, turns the machine backward one day for each red flash which has shown in the window. Where the operator in computing interest on a 365-day basis passes the 28th of February, it will show printed on a green background, and then in ordinary years when he has reached his desired date, he turns forward two additional days, or in leap year, one additional day.

In Figures 1 and 4, I have shown means whereby the band 49 may be adjusted. The side plates 2 and 3 are recessed as at 263 for receiving a sliding bearing 264. Each plate is provided with such a bearing. The bearing slidably supports the lower roller 51. The bearings are provided with keys 265 which are slidably disposed within keyways 266. In Figure 1, I have shown a fixed member 267 for supporting an adjusting screw 268 which has a swivel connection with the bearing 264. Thus it will be seen that the bearing may be adjusted by rotation of the screw. A slight turning of the screw will suffice, as very little adjustment is necessary at this point.

Let us refer to Figure 6 for the purpose of additionally explaining the arrangement of the interest tables. Let us take the right-hand perpendicular column associated with the 4¼% rate. An intersection of a perpendicular and horizontal line immediately to the left of the first left-hand figure in the top horizontal line would give us the interest on $1.00 for 178 days. When the perpendicular line is moved to the right between the zero and the 2, we have an indicated interest on $10.00 for the above-mentioned time. Moving the line one more figure to the right, we would have the interest on $100.00; another moving, $1,000.00; a further shift, $10,000.00; again, $100,000.00; and finally to a position after the last digit, we would have an indicated interest on $1,000,000.00. The top horizontal line of figures which we have just discussed is followed by a second horizontal line of figures representing twice the amount represented in the first line; the next line represents three times the amount shown in the first line; the next line represents four times the amount in the first line, and so on progressively until the last line in the column represents an amount nine times that shown in the first line. As a result, when the perpendicular line of the shuttle is placed in the very middle of the column, dividing it in half, it is in what is known as the thousandth notation. In other words, the perpendicular hair line at this point bisects the circle surrounding the interest rate. If at this point the key 9 were to be pressed, it would show $189.125 of accrued interest or the interest for the indicated time 178 days on $9,000.00, but, if the key 1 were pressed instead, it would indicate the accrued interest to be $21.014, or the interest accrued on $1,000.00, and so in sequence with the intervening lines. Whatever key is depressed, the moment it is released the perpendicular line leaps to the left.

Taking the column 200 associated with the portion 190 of the band and placing the perpendicular hair line on the shuttle for dividing the column perpendicularly in half and reading the first horizontal line which is ordinarily associated with the amount of $1.00, we have $24.722 interest for 178 days at 5% on $1,000.00; moving the hair line to the left one figure divides the rate by 10 and the indicated result of $2.4722 is .5 of 1%, and moving still farther one position where .24722 is indicated, we have .05 of 1%, and by a still farther move, we obtain .005 of 1%. But, if instead of moving to the left, we had moved the hair line to the right one figure, showing a result of $247.22, this is the interest for that time at 50%. In like manner, the 1% column can be made to read 10%; the 2% column can be made to read 20%; 3% column, 30%, and so on, and each of them can be correspondingly divided by 10 by the process just indicated.

Upon that section of the band where the full years are shown, these years can by the process just indicated, by moving the perpendicular line of the shuttle to the right one position, be increased ten times; as, for instance, moving the shuttle from its proper position so far as numerical notation is concerned one position increases one year to ten; moved again to the right, it increases it to one hundred; again to the right, to a thousand. This of course applies to each of the years 1 to 9 shown in this section of the interest table.

An important feature in connection with my device is the fact that the machine is always adjusted with to-day. Let us assume that on yesterday at the close of the business day the machine was set with the interest table showing the zero position and the time window showing August 19. At the opening of business, we will say, on this morning, which is August 20, we disengage the clutch, move the crank 67 to a position for bringing the gear 68 in engagement with the pinion 71, turn the crank counterclockwise, and move the time tape until August 20 appears in the window.

I claim:

1. A calculating device comprising a supporting casing, rollers positioned within the supporting casing, a band wound upon said rollers and being provided with interest tables upon its side, said supporting casing being provided with a sight opening, certain of said rollers being positioned for holding a portion of the band in reading relation with the sight opening, levers mounted upon two sides of the supporting casing and pivotally connected thereto, a frame mounted upon the supporting casing and operatively connected with said levers, a shuttle movably carried by said frame, a plurality of keys, each provided with an indicating numeral and operatively connected with said levers, said shuttle being provided with locating elements arranged in operative relation with that portion of the band positioned in operative relation with said sight opening, and means for moving the shuttle relatively to the frame when the latter is moved through the medium of one of said plurality of keys for shifting the locating elements, whereby accrued interest on a given amount may be determined when keys bearing the numerals representing the digits of said amount are moved.

2. A calculating device comprising spaced-apart supporting means, rollers positioned within the supporting means, a band wound upon said rollers and being provided with interest tables upon its side, guiding means carried by said spaced-apart supporting means, a frame movably supported by said guiding means, certain of said rollers being arranged for positioning a portion of the band in reading relation with said frame, a shuttle provided with locating means and movably carried by the frame, means for shifting the shuttle relatively to the frame when the latter is moved, and a plurality of keys operatively connected with said frame whereby accrued interest on a given amount may be determined when a plurality of numbered keys bearing the represented digits of said amount are moved.

3. A calculating device comprising a pair of spaced-apart side portions, said side portions being provided with inclined edges, a transparent piece of material secured to said inclined edges, a plurality of rollers positioned between the side portions and supported thereby, a band wound upon the rollers and being provided with interest tables upon its side, certain of said rollers being arranged for positioning a portion of the band in close proximity to said transparent material, guide means secured to the side portions and in alignment with said inclined edges, a frame movably carried by said guides, a shuttle movably carried by the frame and being provided with a locating element arranged in operative relation with the interest tables upon that portion of the band positioned in operative relation with said transparent material, means for moving the shuttle relatively to the frame when the latter is moved, a plurality of numbered keys, and means independently and operatively connecting the keys with said frame and said shuttle for indicating accrued interest on a given amount when keys bearing the numerals representing the digits of said amount are moved.

4. A calculating device comprising a spaced-apart supporting means, a plurality of rollers positioned between the spaced-apart supporting means and carried thereby, a band wound upon the rollers and being provided with interest tables upon its side, a casing having a pair of sight openings and arranged for enclosing said spaced-apart supporting means, a frame movably connected with the spaced-apart supporting means and aligned with one of said sight openings, rollers mounted upon the outer side of one of said spaced-apart supporting means, a time tape wound upon said last-named rollers, the latter being arranged for presenting a portion of the time tape before the other of said sight openings, means for rotating one of the rollers associated with said band and one of the rollers associated with the time tape and means whereby both of said last-named rollers may be moved in synchronism or independently of each other, a shuttle movably carried by said frame and provided with a locating element arranged in operative relation with that portion of the band positioned in operative relation with its sight opening, means for moving the shuttle relatively to the frame when the latter is moved, a plurality of numbered members, and means operatively connecting the latter with said frame, whereby accrued interest on a given amount may be determined when numbered members representing the digits of said amount are moved.

5. A calculating device comprising a supporting casing, rollers positioned within the supporting casing, a band wound upon said rollers and being provided with interest tables upon its side, said supporting casing being provided with a sight opening, certain of said rollers being positioned for holding a portion of the band in reading relation with the sight opening, levers mounted upon two sides of the supporting casing and pivotally connected thereto, a frame mounted upon the supporting casing and operatively connected with said levers, a shuttle movably carried by said frame, a plurality of keys, each provided with an indicating numeral and operatively connected with said levers, said shuttle being provided with locating elements arranged in operative relation with that portion of the band positioned in operative relation with said sight opening, means for moving the shuttle relatively to the frame when the latter is moved through the medium of one of said plurality of keys for shifting the locating elements, whereby accrued interest on a given amount may be determined when keys bearing the numerals representing the digits of said amount are moved, and spring means operatively connected with certain of the rollers for holding said band in a taut condition.

6. A calculating device comprising spaced-apart supporting means, rollers positioned within the supporting means, a band wound upon said rollers and being provided with interest tables upon its side, guiding means carried by said spaced-apart supporting means, a frame movably supported by said guiding means, certain of said rollers being arranged for positioning a portion of the band in reading relation with said frame, a shuttle provided with locating means and movably carried by the frame, means for shifting the shuttle relatively to the frame when the latter is moved, a plurality of keys operatively connected with said frame whereby accrued interest on a given amount may be determined when a plurality of numbered keys bearing the represented digits of said amount are moved, and oppositely wound spring means connected with certain of the rollers for holding the band in a taut condition.

7. A calculating device comprising a pair of spaced-apart side portions, said side portions being provided with inclined edges, a transparent piece of material secured to said inclined edges, a plurality of rollers positioned between the side portions and supported thereby, a band wound upon the rollers and being provided with interest tables upon its side, certain of said rollers being arranged for positioning a portion of the band in close proximity to said transparent material, guide means secured to the side portions and in alignment with said inclined edges, a frame movably carried by said guides, a shuttle movably carried by the frame and being provided with a locating element arranged in operative relation with the interest tables upon that portion of the band positioned in operative relation with said transparent material, means for moving the shuttle relatively to the frame when the latter is moved, a plurality of numbered keys, means independently and operatively connecting the keys with said frame and said shuttle for indicating accrued interest on a given amount when keys bearing the numerals representing the digits of said amount are moved, and spring means operatively connected with certain of the rollers for holding the band in a taut condition.

8. A calculating device comprising a spaced-apart supporting means, a plurality of rollers positioned between the spaced-apart supporting means and carried thereby, a band wound upon the rollers and being provided with interest tables upon its side, a casing having a pair of sight openings and arranged for enclosing said spaced-apart supporting means, a frame movably connected with the spaced-apart supporting means and aligned with one of said sight openings, rollers mounted upon the outer side of one of said spaced-apart supporting means, a time tape wound upon said last-named rollers, the latter being arranged for presenting a portion of the time tape before the other of said sight openings, means for rotating one of the rollers associated with said band and one of the rollers associated with the time tape and means whereby both of said last-named rollers may be moved in synchronism or independently of each other, a shuttle movably carried by said frame and provided with a locating element arranged in operative relation with that portion of the band positioned in operative relation with its sight opening, means for moving the shuttle relatively to the frame when the latter is moved, a plurality of numbered members, means operatively connecting the latter with said frame, whereby accrued interest on a given amount may be determined when numbered members representing the digits of said amount are moved, and spring means operatively connected with certain of the rollers associated with said band for holding the latter and the time tape in taut conditions.

9. A calculating device comprising supporting members, a plurality of rollers movably carried by said supporting members, a band wound upon said rollers and being provided with interest tables upon its sides, a casing for enclosing said supporting members and provided with a sight opening, certain of said rollers being arranged for presenting opposite sides of the band in reading relation with said sight opening, a frame movably mounted upon the supporting members and aligned with said sight opening, a shuttle provided with locating means and movably mounted in said frame, a spacing member carried by said supporting members and operatively connected with the shuttle for moving the same relatively to the frame when the latter is moved, a plurality of numbered keys, and means operatively connecting the keys with said frame, whereby accrued interest on a given amount may be determined when keys bearing the numerals representing the digits of said amount are moved.

10. A calculating device comprising supporting members, rollers rotatably carried by said supporting members, a band wound upon said rollers and being provided with interest tables upon its side, certain of said rollers being arranged for holding the band in a readable position, said interest tables being arranged in columns upon the band, a movable frame carried by said supporting members and arranged in operative relation with that portion of the tape held in a readable position, an interest-indicating means movably carried by the frame, means for shifting the interest-indicating means from one column of interest tables to another when said frame is moved, and a plurality of numbered means for moving the frame various amounts, whereby accrued interest on a given amount may be determined when numbered means bearing the numerals representing the digits of said amount are moved.

11. A calculating device comprising supporting members, rollers rotatably carried by said supporting members, a band wound upon said rollers and being provided with interest tables upon its side, certain of said rollers being arranged for holding the band in a readable position, said interest tables being arranged in columns upon the band, a movable frame carried by said supporting members and arranged in operative relation with that portion of the tape held in a readable position, an interest-indicating means movably carried by the frame, means for shifting the interest-indicating means from one column of interest tables to another when said frame is moved, and a plurality of numbered means for moving the frame various amounts, whereby accrued interest on a given amount may be determined when numbered means bearing the numerals representing the digits of said amount are moved, said interest tables being arranged in progressively increasing and decreasing values in different directions.

12. A calculating device comprising supporting members, rollers rotatably carried by said supporting members, a band wound upon said rollers and being provided with interest tables upon its side, certain of said rollers being arranged for holding the band in a readable position, said interest tables being arranged in columns upon the band, a movable frame carried by said supporting members and arranged in operative relation with that portion of the tape held in a readable position, an interest-indicating means movably carried by the frame, means for shifting the interest-indicating means from one column of interest tables to another when said frame is moved, and a plurality of numbered means for moving the frame various amounts, whereby accrued interest on a given amount may be determined when numbered means bearing the numerals representing the digits of said amount are moved, said interest tables being arranged in a pair of groups, one group representing values for each day for a period of a year and the other of said groups representing values for one year or a plurality of years.

13. A calculating device comprising supporting members, rollers rotatably carried by said supporting members, a band wound upon said rollers and being provided with interest tables upon its side, certain of said rollers being arranged for holding the band in a readable position, said interest tables being arranged in columns upon the band, a movable frame carried by said supporting members and arranged in operative relation with that portion of the tape held in a readable position, an interest-indicating means movably carried by the frame, means for shifting the interest-indicating means from one column of interest tables to another when said frame is moved, and a plurality of numbered means for moving the frame various amounts, whereby accrued interest on a given amount may be determined when numbered means bearing the numerals representing the digits of said amount are moved, said interest tables being arranged in a pair of groups, one group representing values for each day for a period of a year and the other of said groups representing values for one year or a plurality of years, said groups reading progressively in increased or decreased values in opposite directions.

14. A calculating device comprising supporting means, a plurality of rollers movably carried by the supporting means, a band wound upon said rollers and having interest tables upon its sides, certain of the rollers being arranged for holding one side of a portion of the band in a readable position, other of said rollers being arranged for holding a portion of the opposite side of the band in reading relation and in operative relation with the first-named portion, a frame movably carried by said supporting means and arranged in operative relation with said portions of the band, a product-locating device movably carried by the frame and arranged in operative relation with said portions of the band, and means for operating the frame and the product-locating device for determining interest on a given amount.

15. A calculating device comprising a sheet of material mounted on a supporting structure and provided with interest tables thereon, a decimal indicator disposed over the sheet and longitudinally and laterally movable with respect thereto, means for moving the indicator a predetermined distance in the longitudinal direction, and means for moving the indicator a given distance in the lateral direction.

16. A calculating device comprising a sheet of material mounted on a supporting structure and provided with interest tables thereon, a decimal indicator disposed over the sheet and longitudinally and laterally movable with respect thereto, a plurality of keys representative of the digits and operatively connected with the indicator for moving the indicator in the longitudinal direction to predetermined positions with respect to the interest tables, and means for moving the indicator a given distance in the lateral direction with each actuation of a key.

17. A calculating device comprising a casing, rollers mounted within the casing, a band mounted on the rollers and provided with interest tables thereon, said casing being provided with an opening therein for exposing certain of the interest tables depending on the position of the band, a decimal indicator longitudinally and laterally movable with respect to the band, and a plurality of keys, each of said keys representing a digit and being operatively connected with the decimal indicator for moving said decimal indicator in the longitudinal direction a predetermined distance when the key is actuated.

18. A calculating device comprising a casing, rollers mounted within the casing, a band mounted on the rollers and provided with interest tables thereon, said casing being provided with an opening therein for exposing certain of the interest tables depending on the position of the band, a decimal indicator longitudinally and laterally movable with respect to the band, a plurality of keys, each of said keys representing a digit and being operatively connected with the decimal indicator for moving said decimal indicator in the longitudinal direction a predetermined distance when the key is actuated, and means for moving said decimal indicator a given distance in the lateral direction with each operation of a key.

19. In a calculating device, the combination of a supporting structure, rollers mounted on the supporting structure, a sheet of material mounted on the rollers and provided with a column of rows of figures thereon, said rows of figures being arranged in groups of nine, each of said rows in a group being associated with a digit, a plurality of keys mounted on the supporting structure and equal in number to said rows of figures in a group, each of said keys being representative of a digit and associated with the corresponding rows of figures in the groups, and means operatively associated with each of the keys for determining the decimals in the rows of figures according to the positions of the represented digits in a principal when the keys are actuated.

20. A calculating device comprising a sheet of material provided with mathematical tables thereon, a decimal indicator positioned above the sheet and movable longitudinally and laterally with respect thereto, and means for moving the indicator given distances longitudinally and laterally for properly positioning the decimal indicator with respect to the tables.

21. A calculating device comprising a sheet of material provided with a column of rows of figures thereon, said rows of figures being arranged in groups, each of said rows in a group being associated with a digit, a decimal indicator positioned above the sheet and movable longitudinally and laterally with respect thereto, means for moving the indicator longitudinally for selecting a row of figures representatives of a digit in a principal, and means for moving the indicator laterally for positioning the decimal indicator according to the position of the digit in the principal.

22. A calculating device comprising a sheet of material provided with mathematical tables thereon, a decimal indicator positioned above the sheet and movable longitudinally and laterally with respect thereto, and keys operatively connected with the indicator for moving said indicator given distances longitudinally and laterally with respect to the sheet for properly positioning the decimal indicator with respect to the tables.

23. A calculating device comprising a structure, a sheet of material carried by the supporting structure and provided with a column of rows of figures thereon, said rows of figures being arranged in groups, each of said rows in a group being associated with a digit, a plurality of keys representative of digits mounted on the supporting structure and associated with the corresponding rows of figures in the groups, a decimal indicator operatively associated with the keys for determining the decimal in the rows of figures according to the position of the represented digits in a principal, when the keys are actuated.

Signed at Chicago, in the county of Cook, and State of Illinois, this 20th day of August, A. D. 1929.

JACOB F. DENNEY.